Patented May 30, 1939

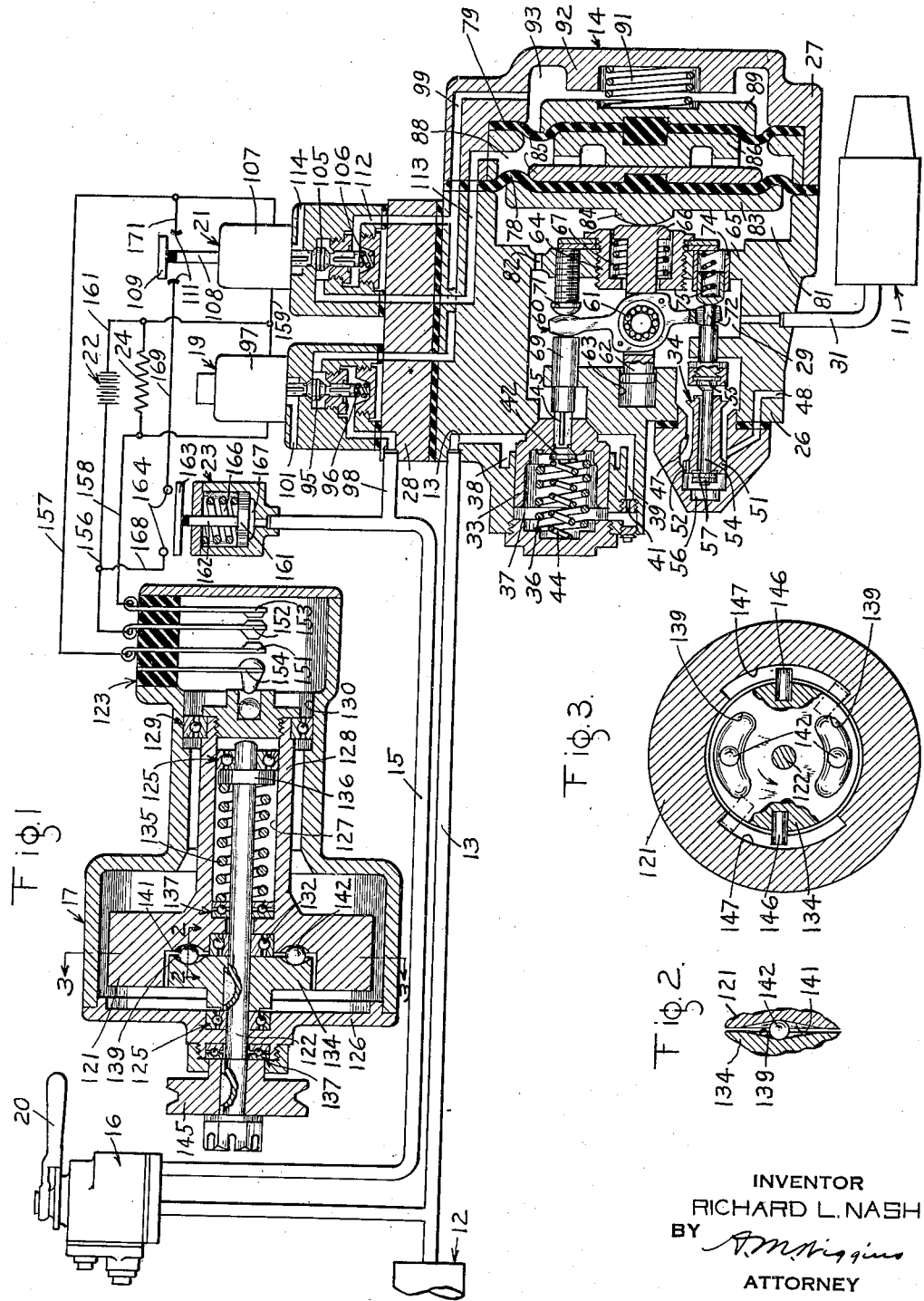

2,160,190

UNITED STATES PATENT OFFICE 2,160,190

BRAKE CONTROL MEANS

Richard L. Nash, Wilkinsburg, Pa., assignor to The Westinghouse Air Brake Company, Wilmerding, Pa., a corporation of Pennsylvania Application February 25, 1938, Serial No. 192,516

24 Claims. (Cl. 303—21)

This invention relates to brake control means, and particularly to brake control means for guarding against sliding of the wheels of a vehicle, such as a railway car or train.

In the copending application Serial No. 137,956 of Clyde C. Farmer, filed April 20, 1937, now Patent 2,140,620 assigned to the assignee of the present application, there is disclosed a brake control equipment including a rotary inertia device which is operative during an application of the brakes in response to the slipping of a vehicle wheel to first cause rapid release of the brakes on the slipping wheel, to cause the wheel to accelerate back toward a speed corresponding to vehicle speed before the wheel attains a locked-wheel state and then, when the vehicle wheel returns substantially to a speed corresponding to vehicle speed, being operative to effect reapplication of the brakes to a lower degree than that which initiated the slipping of the wheel. It should be understood that, as employed herein, the term "slip" or "slipping" means rotation of a vehicle wheel at a speed less than a speed corresponding to vehicle or rail speed and that the time during which a vehicle wheel slips is referred to as the "slipping interval" or the "slipping time". The term "sliding" is employed herein to designate only the dragging of the vehicle wheel along a rail in the locked-wheel state.

The inertia device of the above copending application comprises a fly-wheel inertia element driven, as from a wheel axle, according to the speed of rotation of a vehicle wheel. The flywheel is so mounted and arranged that when the vehicle wheel slips, the fly-wheel tends to over-run the driving shaft therefor and in so doing shifts in an axial direction to effect operation of circuit-controlling switches controlling the energizing circuits for electroresponsive devices of an electropneumatic relay device controlling the pressure in a brake cylinder. Unless a vehicle wheel is decelerated or accelerated at a rate in excess of a certain rate, such as would occur only in case the vehicle wheel slips, the fly-wheel inertia element is not shifted axially to effect operation of the electropneumatic control relay device controlling brake cylinder pressure.

When a vehicle wheel accelerates back toward a speed corresponding to vehicle speed due to the automatic release of the brakes, the fly-wheel inertia element shifts from a leading to a lagging position with respect to its driving shaft and in so doing is operated to cause the relay device to reapply the brakes momentarily. While the interval of time during which the fly-wheel inertia element is changing from a leading to a lagging position with respect to its driving shaft is only momentary, being possibly of the order of one-tenth of a second, nevertheless, the momentary supply of fluid under pressure to the brake cylinder and its subsequent release when the flywheel shifts to its lagging position is a waste of fluid under pressure since no useful effect is accomplished.

It is a well known fact that in order to insure acceleration of a vehicle wheel back toward a speed corresponding to vehicle speed before it attains the locked-wheel state, once the wheel starts to slip, it is desirable not only to rapidly reduce the degree of application of the brakes on the vehicle wheel which starts to slip but also to substantially completely release the brakes. It follows, therefore, that the momentary reapplication of the brakes, such as is inherently effected by the inertia device of the above-mentioned copending application, might be sufficient to cause a slipping vehicle wheel to continue to decelerate to the locked-wheel state and thus slide.

It is accordingly an object of my invention to provide means for preventing the momentary reapplication of the brakes in a brake control equipment of the character employed in the copending application mentioned above, so as to guard against sliding of the vehicle wheel.

It is a further inherent characteristic of one form of inertia device disclosed in the above copending application to cause reapplication of the brakes while the vehicle wheel is still slipping and while it approaches a speed corresponding to vehicle speed.

It is possible, therefore, if the reapplication of the brakes is initiated before the vehicle wheel fully attains vehicle speed, that the vehicle wheel will again commence to slip so that, conceivably, the vehicle wheel may be continually slipping in repeated cycles of retardation and acceleration during an application of the brakes. Such a condition is undesirable, and a modified inertia device is, therefore, proposed in the above-mentioned copending application for delaying the reapplication of the brakes sufficiently to insure that the vehicle wheel will be fully restored to a speed corresponding to vehicle speed before reapplication of the brakes is effected.

A vehicle brake equipment for guarding against sliding of the vehicle wheels is also disclosed in the copending application, Serial No. 176,184 of Burton S. Aikman filed November 24, 1937, and assigned to the assignee of this application. The mechanism of this copending application is such as to delay reapplication of the brakes on a wheel until after it returns fully to vehicle speed following slipping but is not applicable to a brake control equipment of the character employed in this application.

It is, accordingly, a further object of my invention to provide novel means, applicable to a brake control equipment such as described in copending application Serial No. 137,956, which functions to delay the reapplication of the vehicle brakes until after the return of the slipping vehicle wheel to vehicle speed and thereby reduces the possibility of recurrence of slipping.

The above objects, and other objects of my invention which will be made apparent, hereinafter, are attained by an illustrative embodiment of my invention subsequently to be described and shown in the accompanying drawing, wherein Fig. 1 is a simplified diagrammatic view, with parts thereof in section, showing a brake control equipment having my invention embodied therein, and Figs. 2 and 3 are sectional views, taken on the lines 2—2 and 3—3, respectively, of Fig. 1, showing details of construction of the inertia device of Fig. 1.

*Description of equipment*

Referring to Fig. 1, the equipment shown comprises a brake cylinder 11, a source of fluid under pressure such as a main reservoir 12, a supply pipe 13 connected to the main reservoir 12, an electro-pneumatic control valve device 14 operatively controlling the supply of fluid under pressure from the supply pipe to the brake cylinder 11 and controlling the release of fluid under pressure from the brake cylinder 11, a control pipe 15 the pressure in which is controlled by a self-lapping brake valve device 16, and an inertia device 17 operative in response to slipping of a vehicle wheel for controlling the supply of fluid under pressure from the control pipe 15 to the control valve device 14 and its release from the control valve device, whereby the operation of the control valve device is effected.

The control valve device 14 includes two electromagnetically operated valve devices 19 and 21, hereinafter referred to as magnet valve devices, the energization of which is effected by current supplied from a source of current, such as a storage battery 22, under the control of the inertia device 17 and also, in part, under the control of a pressure operated switch 23, in the manner to be hereinafter described.

According to my invention I provide in shunt or parallel relation to the magnet valve device 19, a resistor 24 which functions to delay deenergization of the electromagnet winding of the magnet valve device 19 to accomplish the purposes of my present invention.

Considering the parts of the equipment in detail, the control valve device 14 is of the type described and claimed in the above-mentioned copending application Serial No. 137,956 and comprises a relay valve section 26, a diaphragm section 27 and a magnet valve section 28.

The portion of the casing of the control valve device 14 containing the relay valve section 26 has formed therein a chamber 29, hereinafter referred to as the pressure chamber, to which the brake cylinder 11 may be constantly connected as by a pipe and passage 31. The supply of fluid under pressure to the pressure chamber 29 is under the control of a so-called main supply valve 33 and the release of fluid under pressure from the pressure chamber 29 is under the control of a so-called main release valve 34.

The main supply valve 33 is in the form of a valve piston which operates slidably in a suitable bore in the casing and which is urged toward and into seated position on an associated valve seat by a coil spring 36 which is contained in a chamber 37 at one side of the supply valve. Surrounding the main supply valve 33 at the outer seated area thereof is an annular chamber 38 to which the supply pipe and passage 13 is connected. The chamber 37 at the one side of the main supply valve 33 is connected to the annular chamber 38 through a passage 39 containing a choke 41. Since the supply pipe 13 is constantly charged to the pressure of main reservoir 12, it will be seen that the main supply valve 33 is urged to a seated position by the pressure of the fluid supplied from the supply pipe 13 to the chamber 37 as well as by the spring 36.

Contained in chamber 37 is a pilot supply valve 42 which has a fluted stem 45 that is slidably carried in an axial bore in the main supply valve 33 and projects into pressure chamber 29. The pilot valve 42 is urged into seated relation on the main supply valve 33 by a coil spring 44 concentrically disposed within the coil spring 36.

So long as the pilot valve 42 is seated on the main supply valve 33, the combined force of the fluid pressure in the chamber 37 and of the spring 36 acts to maintain the main supply valve 33 seated. When the pilot valve 42 is unseated, however, fluid under pressure in chamber 37 is rapidly vented past the pilot valve into the pressure chamber 29, the choke 41 preventing the influx of fluid under pressure to the chamber 37 except at a restricted rate. The fluid pressure force tending to maintain the main supply valve 33 seated is thus reduced and the main release valve is thus said to be unloaded, that is, rendered more easily shiftable away from its associated valve seat.

The main release valve 34 has a tubular body adapted to be shifted slidably in a suitable bore 47 in the casing, the bore 47 being open at one end to the pressure chamber 29 and at an intermediate point to atmosphere through a passage 48. The tubular body is formed at one end to act as a valve for seating on an associated valve seat on the casing to close the opening of the bore 47 to the pressure chamber 29. Formed at the opposite end of the main release valve 34 is a piston 51 which is provided with a restricted port 52 for a purpose which will be explained hereinafter.

Slidably carried in the central axial bore of the tubular body of the main release valve 34 is a rod or stem 54 carrying thereon a so-called pilot release valve 55 which is adapted to seat on an associated valve seat formed at the valve end of the main release valve 34. The rod 54 extends into a chamber 56 at the left of the piston 51 and has thereon a nut and lock nut 57 which engage the piston 51 to limit the degree to which the pilot valve may be unseated from the main release valve 34.

When the main release valve 34 is unseated, the pressure chamber 29 is open to atmosphere by way of the bore 47 and passage 48. When the pilot release valve 55 is seated on the main release valve 34 and the main release valve 34 is seated on its associated valve seat, the communication from the pressure chamber 29 to atmosphere just described is closed. If, while fluid under pressure is present in the pressure chamber 29, the pilot valve 55 is unseated from the main release valve 34, fluid under pressure flows through the passage in the tubular body of the main release valve 34 to the chamber 56, thereby equalizing or balancing the fluid pressure force tending to maintain the main release valve 34 seated on its associated valve seat and enabling movement of the release valve 34 away from its valve seat with a relatively light application of force. The purpose of the restricted port 52 in the piston 51 on the main release valve 34 is to enable fluid under pressure in the chamber 56 to leak away to atmosphere.

The main and pilot supply valves 33 and 42 and the main and pilot release valves 34 and 55 are operated by a mechanism including a lever 60 which is pivotally mounted intermediate the ends thereof, as by ball bearings 61, on a plunger 62. One end of the plunger 62 is slidably supported and guided in a bore 63 in the casing and the other end is slidably supported in a bushing 64 mounted in a wall or abutment 65 in the casing. The latter end of the plunger 62 is provided with a flange 66 which fits loosely in the bushing 64, and a coil spring 67 is interposed between the inner face of the flange 67 and an inwardly extending flange on the bushing 64 for yieldingly resisting movement of the plunger 62 in the left-hand direction, as viewed in the drawing.

One end of the lever 60 is so disposed as to engage one end of a stem or plunger 69, which is slidably mounted in the casing in axial alignment with the fluted stem of the pilot supply valve 42, the opposite end of the stem 69 engaging the end of the fluted stem 45 of the pilot supply valve 42. An adjustable stop screw 71 is fixed in the wall 65 of the casing on the opposite side of the lever 60 to limit the movement of this end of the lever 60 in the right-hand direction.

The opposite end of the lever 60 is formed as a yoke and straddles a reduced portion 72 of the rod 54 carrying the pilot release valve 55. The end of the rod 54 adjacent the yoke at the end of the lever 60 is slidably supported in a bushing 74 mounted in the wall 65 of the casing. A spring 75 contained in the bushing and acting on the end of the rod 54 serves as a cushion-stop for movement of the rod 54 in the right-hand direction.

The diaphragm section 27 of the control valve device 14 comprises two unconnected movable abutments or diaphragms 78 and 79 suitably clamped along the periphery thereof in the casing and disposed in spaced coaxial relation with each other and in axial alignment with the axis of the plunger 62. The diaphragms 78 and 79 are of different effective pressure areas and, for purposes of illustration, it may be assumed that the diaphragm 79 has an effective pressure area which is seventy-five per cent of the effective pressure area of the diaphragm 78.

One side of the larger diaphragm 78 is open to a chamber 81 in the relay valve section 26, which is constantly open through a relatively large passage 82, to the pressure chamber 29. Affixed to the face of the larger diaphragm 78 within the chamber 81, preferably without perforating the diaphragm, is a follower disk 83 having a rounded projection 84 which engages the flange 66 on the end of the plunger 62. The diaphragm 78 has fixed to the opposite face thereof, preferably without perforating the diaphragm, a follower disk 85 which is adapted to engage but is unconnected to a follower disk or element 86 that is fixed on the adjacent face of the smaller diaphragm 79, preferably without perforating the diaphragm. The follower disks 85 and 86 thus maintain the two diaphragms 78 and 79 at least a minimum distance apart and permit movement of each diaphragm independently of the other. The space between the two diaphragms 78 and 79 is hereafter designated as chamber 88.

The smaller diaphragm 79 has fixed to the opposite face thereof, preferably without perforating the diaphragm, a follower plate 89; and a coil spring 91, interposed between the plate 89 and the casing, yieldingly urges the diaphragm 79 in the left-hand direction so that the follower disk 89 is normally spaced away from and out of contact with an annular stop 92 formed on the casing which limits the movement of the diaphragm in the right-hand direction. The space between the smaller diaphragm 79 and the casing is hereinafter designated as chamber 93.

It will be apparent that when fluid under pressure is supplied to the chamber 93 at the right of the smaller diaphragm 79 while the chamber 88 between the diaphragms is maintained at atmospheric pressure, both diaphragms are urged in the left-hand direction to cause the plunger 62 to be shifted accordingly. In the similar manner when fluid under pressure is supplied to chamber 88 only or to both chamber 88 and chamber 93, only the larger diaphragm 78 is shifted in the left-hand direction to move the plunger 62.

Assuming then, that the plunger 62 is shifted in the left-hand direction from the position shown in response to the supply of fluid under pressure to either or both of the chambers 88 and 93, the lever 60 is first pivoted at the end thereof held between the stem 69 and the stop screw 71 and the opposite end is shifted to effect seating of the pilot release valve 55 on the main release valve 34 and then shifting of the main release valve 34 into seated relation on its associated valve seat to close off the exhaust communication to atmosphere from the pressure chamber 29. Thereafter, as movement of the plunger 62 in the left-hand direction continues, further movement of the yoke end of the lever 60 is stopped and thus the opposite end of the lever is shifted in the left-hand direction to effect unseating of the pilot supply valve 45. As previously explained, the main supply valve 33 is thus unloaded by the release of fluid under pressure from the chamber 37 at the back of the valve into the pressure chamber 29. After unseating the pilot supply valve 45, the end of the stem 69 engages the main supply valve 33 and, since the main supply valve 33 is unloaded as just described, causes it to be shifted away from its associated valve seat with comparative ease. Communication is thus established through which fluid under pressure is supplied from the supply pipe and passage 13 past the unseated main supply valve 33 to the pressure chamber 29 and connected brake cylinder 11.

Now when the pressure of the fluid in the pressure chamber 29 effective in the chamber 81 on the left face of the largest diaphragm 78 increases sufficiently to substantially balance the fluid pressure force urging the diaphragms and the plunger 62 in the left-hand direction, the spring 67 becomes effective to shift the plunger and the diaphragms, in the right-hand direction. The spring 36 thus becomes effective to reseat the main supply valve 33 and pivot the lever 60, simultaneously, on the plunger 62 to maintain the main release valve 34 and the pilot release valve 55 seated to prevent the exhaust of fluid under pressure from the pressure chamber 29. After the main supply valve 33 is seated, further movement of the plunger 62 in the right-hand direction enables the spring 44 to reseat the pilot supply valve 45 on the main supply valve 33. Thus the communication between the chamber 37 at the back of the main supply valve 33 and the pressure chamber 29 is again closed so that fluid pressure is subsequently restored in chamber 37 through the choke 41. Accordingly when the main and pilot supply valves 33 and 42 are again seated, the increase in pressure in the pressure chamber 29 is stopped and consequently further shifting of the diaphragms in the left-hand direction is stopped. Consequently, the plunger 62 is maintained in its intermediate position in which the main and pilot supply valves and the main and pilot release valves are all seated so that the pressure established in the pressure chamber 29 and brake cylinder 11 is maintained.

When the fluid pressure force urging one or more of the diaphragms in the left-hand direction is released, the pressure established in the pressure chamber 29 and chamber 81 at the left of the larger diaphragm 78 becomes effective to shift the diaphragms in the right-hand direction substantially to the position shown, so that the spring 67 then returns the plunger 62 to the position shown. With the pilot valve 55 seated on the main release valve 34 and the main release valve 34 seated on its associated valve seat, it will be seen that the pressure in the pressure chamber 29 acts to maintain the main release valve 34 seated since the pressure in the chamber 56 at the left of the piston 51 on the release valve is at atmospheric pressure. However, when the plunger 62 is shifted back in the right-hand direction by the spring 67, only the yoked end of lever 68 straddling the stem 54 is free to move since the opposite end is held between the stem 69 and the stop screw 71. Consequently the rod 54 is shifted in the right-hand direction to unseat the pilot release valve 55 and thus cause fluid under pressure from the pressure chamber 29 to flow through the central passage of the tubular body of the main release valve 34 to the chamber 56, thus balancing the fluid pressure forces acting on the main release valve and enabling it to be shifted with comparative ease in response to movement of the plunger 62.

The main release valve 34 is thus shifted in the right-hand direction and unseated from its associated valve seat to open the exhaust communication including passage 48 through which fluid under pressure flows from the pressure chamber 29 and connected brake cylinder 11 to atmosphere.

It will be apparent that the pressure established in the pressure chamber 29 and brake cylinder 11 depends upon the pressure of the fluid supplied to the chambers 88 and 93 and also whether or not the chamber 93 only is charged with fluid under pressure or both the chamber 88 and the pressure chamber 93 are charged with fluid under pressure. Since the diaphragm 79 is assumed to be seventy-five per cent of the area of the diaphragm 78, it follows that the pressure established in the pressure chamber 29 and brake cylinder 11, with only chamber 93 charged to a given pressure, will be seventy-five per cent of the pressure established in the pressure chamber and brake cylinder when both the chambers 88 and 93 are charged with fluid at the given pressure.

The chambers 88 and 93 associated with the diaphragms 78 and 79 are charged with fluid under pressure from the control pipe 15 and fluid under pressure is released therefrom under the control of the magnet valve devices 19 and 21.

The magnet valve 19 comprises a double beat valve 95 which is normally urged to an upper seated position by a spring 96 and which is shifted to a lower seated position against the yielding resistance of spring 96 by a suitable plunger, not shown, on which magnetic force is exerted upon energization of an electromagnet winding 97. When in its upper seated position as shown, the double beat valve 95 establishes communication from a branch pipe and passage 98 of the control pipe 15 to a passage 99 leading to the chamber 93 at the right of the smaller diaphragm 79. When the double beat valve 95 is in lower seated position, the communication just described is closed and communication established from the passage 99 to an exhaust passage and port 101.

The magnet valve 21 is similar, in part, to the magnet valve 19 and comprises a double beat valve 105 which is normally urged to an upper seated position by a spring 106 and actuated to a lower seated position against the yielding resistance of the spring 106 by a plunger 108 upon energization of an electromagnet winding 107. The plunger 108 carries, in insulated relation thereon, a contact-bridging member 109 which is normally out of engagement with a pair of fixed contact members 111 and which is adapted to be shifted downwardly into bridging contact therewith when the double beat valve 105 is shifted to its lower seated position. The contact-bridging member 109 establishes a holding circuit for the electromagnet winding 107 of the magnet valve 21, in a manner and for a purpose to be explained hereinafter.

When the double beat valve 105 of the magnet valve 21 is in its upper seated position, it establishes communication from a branch passage 112 of the passage 99 to a passage 113 leading to the chamber 88 between the two diaphragms 78 and 79. When the double beat valve 105 is in its lower seated position, the communication just described is closed and a communication is established through which the passage 113 is connected to an exhaust port and passage 114.

It will thus be apparent that when both the magnet valve devices 19 and 21 are deenergized, both the chambers 88 and 93 associated with the diaphragms 78 and 79 will be charged to the pressure established in the control pipe 15. If the magnet valve 19 is deenergized while the magnet valve 21 is energized, it will be apparent that fluid under pressure will be exhausted from the chamber 88 between the diaphragms 78 and 79 and only the chamber 93 to the right of the smaller diaphragm 79 will be charged to the pressure in the control pipe 15.

The brake valve device 16 is of a self-lapping type, such as described and claimed in Patent 2,042,112 of Ewing K. Lynn and Rankin J. Bush. It comprises briefly, a valve mechanism effective when the operating handle 20 thereof is in its normal brake release position, to exhaust fluid under pressure from the control pipe 15 and operative when the handle 20 is shifted into an application zone out of its normal release position to supply fluid under pressure from the supply pipe 13 to the control pipe 15 and establish therein a pressure corresponding to the degree of displacement of the operating handle 20 out of its normal release position. If the pressure in the control pipe 15 tends to be reduced by leakage or otherwise from a pressure corresponding to the position in the operating handle out of its normal release position, the valve mechanism is operative automatically to supply fluid under pressure to maintain such pressure in the control pipe 15. The utility of this function of the self-lapping brake valve 16 will be apparent hereinafter.

The inertia device 17 is of the type described in detail in the above-mentioned copending application Serial No. 137,956 and comprises an inertia element in the form of a fly-wheel 121, a driving shaft 122 for the fly-wheel and a switch device 123. The driving shaft 122 is suitably supported at opposite ends thereof by ball bearings 125, one of which is supported in the end cover 126 of the casing and the other of which is slidably supported within a bore 127 in the laterally projecting hub portion 128 of the fly-wheel 121.

The hub portion 128 of the fly-wheel is supported by a ball bearing 129 in a bore 130 of the casing in such manner as to permit both rotary and sliding movement of the fly-wheel 121 in the casing. The main body portion of the fly-wheel 121 is rotarily and slidably supported on the shaft 122 as by a ball bearing 132 inset in a recess in the face of the fly-wheel.

The fly-wheel 121 is rotated by a rotation of the shaft 122 through a clutch arrangement comprising a disk 134 fixed to the shaft 122 and a coil spring 135 so interposed between a collar or flange 136, fixed to the shaft 122 within the hub portion 128 of the fly-wheel, and a shoulder at the end of the bore 127 in the hub portion 128 of the fly-wheel as to urge the fly-wheel 121 and the disk 134 into interlocking engagement. Thrust bearings 137 are provided to sustain the axial thrust of the shaft 122 on the end cover 126 due to spring 135, and the thrust of spring 135 on the fly-wheel 121.

As shown in Figs. 2 and 3, the disk 134 and fly-wheel 121 are interlocked by means of a plurality of spaced pairs of complementary registering recesses 139 and 141 in the adjacent faces of the disk 134 and fly-wheel 121, in each of which recesses is contained a steel ball 142. The recesses 139 and 141 are deepest at the mid-point thereof and slope in opposite directions from the mid-point to the face of the disk 134 and of the fly-wheel 121 so that, under the influence of the spring 135, the steel balls 142 normally seat in the deepest portion of the recesses.

The compressive force or strength of the spring 135 is so designed as to maintain the fly-wheel 121 and disk 134 in interlocking engagement as shown as long as either the disk 134 or the fly-wheel 121 does not accelerate or decelerate with respect to each other in excess of a certain rate, corresponding for example to a ten mile per hour per second retardation or acceleration of a vehicle wheel. It should be understood that the shaft 122 is driven according to the rotative speed of a vehicle wheel in any suitable manner, as by an endless belt or chain connecting a pulley on the axle of the vehicle wheel and a pulley 145 fixed to an extension of the shaft 122 exterior to the casing.

When the vehicle wheel is retarded at a rate such as ten miles per hour per second, which rate will occur only in the event that the wheel slips, or when the vehicle wheel is accelerated at a rate of ten miles per hour per second, which will occur only when the vehicle wheel is accelerating back toward a speed corresponding to vehicle speed after having slipped, the fly-wheel 121 shifts forwardly and backwardly, respectively, relative to the disk 134. In view of the steel balls 142 interposed between the disk and the fly-wheel, the fly-wheel 121 is thus shifted axially in the right-hand direction against the force of spring 135.

The extent to which the fly-wheel 121 and the disk 134 may move rotatively relative to each other in opposite directions is limited, however, as by one or more pins 146 projecting beyond the periphery of the disk 134 and received in cooperating arcuate slots or grooves 147 in the fly-wheel 121.

The switch device 123 of the inertia device 17 may comprise a plurality of resilient contact fingers 151, 152 and 153, similar to those employed in telephone switches, mounted in a row in insulated relation and disposed in axial alignment with the hub portion 128 of the fly-wheel. The contact fingers 151, 152 and 153 are normally spaced apart and disengaged from each other. When the fly-wheel 121 is shifted axially in the right-hand direction in the manner previously described, the end of the hub portion 128 engages and shifts a resilient finger 154 which in turn shifts the contact fingers 151, 152 and 153 so as to effect engagement first of the contact finger 151 with the contact finger 152 and then of the contact finger 152 with contact finger 153.

The contact finger 152 is connected to one terminal of the battery 22, such as the positive terminal, by a wire 156, the contact finger 151 is connected to one terminal of the electromagnet winding 107 of magnet valve 21 as by a wire 157, and the contact finger 153 is connected to one terminal of the electromagnet winding 97 of the magnet valve 19 as by wire 158. The remaining terminals of the electromagnet windings 97 and 107 are connected to the negative terminal of the battery 22, as by a wire 159 and branch wire 161. It will thus be apparent that when the contact fingers 151, 152 and 153 of the switch device 123 are in engagement with each other, both of the magnet valve devices 19 and 21 are energized.

When the electromagnet winding 107 of the magnet valve 21 is energized by engagement of contact fingers 151 and 152, the previously mentioned holding circuit therefore is established for maintaining it energized thereafter, as long as the pressure in the control pipe 15 exceeds a certain uniform low pressure. This is accomplished by means of the pressure switch 23, which is shown diagrammatically as comprising a casing containing a piston 161 having a stem 162 which carries in insulated relation thereon a contact-bridging member 163 adapted to engage a pair of fixed contact members 164. A coil spring 166, interposed between the piston and the casing, yieldingly urges the piston to an extreme position in one direction in which the contact-bridging member 163 disengages the contact members 164. On the side of the piston 161 opposite to the spring 166 is a chamber 167 to which the control pipe 15 is connected. Spring 166 is of such strength that when the pressure of the fluid supplied to the control pipe 15 and acting in the chamber 167 on the piston 161 exceeds a certain uniform low pressure, such as five pounds per square inch, the piston 161 is shifted against the yielding resistance of the spring 166 to cause the contact-bridging member 163 to engage the contact members 164.

One of the contact members 164 of the pressure switch 23 is connected to the positive terminal of the battery 22 by the wire 156 and a branch wire 168; and the other contact member 164 is connected by a wire 169 to one of the contact members 111 of the magnet valve device 21. The other contact member 111 of the magnet valve device 21 is connected to the wire 157 by a branch wire 171.

It will thus be apparent that with the contact-bridging member 163 of the pressure switch 23 engaging the contact members 164, energization of the electromagnet winding 107 due to engagement of the contact fingers 151 and 152 of the inertia device 17 causes actuation of the contact-bridging member 109 of the magnet valve device 21 into contact with the contact members 111 to establish a holding circuit for maintaining the electromagnet winding 107 energized notwithstanding that the contact fingers 151 and 152 thereafter separate. This holding circuit extends from the positive terminal of the battery 22 through wires 156 and 168, contact members 164 and contact-bridging member 163 of the pressure switch 23, wire 169, contact members 111 and contact-bridging member 109 of the magnet valve device 21, wires 171 and 157, electromagnet winding 107 of the magnet valve device 21 and wires 159 and 161 to the negative terminal of the battery 22. The function of the holding circuit will be made apparent hereinafter.

According to my invention, the resistor 24 is connected in shunt relation to the electromagnet winding 97 of the magnet valve 19, and functions upon the separation of contact fingers 152 and 153 of the inertia device 17 to maintain the electromagnet winding 97 of the magnet valve device 19 energized sufficiently to cause the double beat valve 95 thereof to remain in its lower seated position for a predetermined interval of time after the contact fingers 152 and 153 separate. It will be apparent that the voltage induced in the electromagnet winding 97 due to the dying away of the magnetic flux in the magnetic core associated with the electromagnet winding causes a flow of current in the local circuit including the electromagnet winding 97, wire 157, resistor 24 and wire 161, which current falls to zero in a certain length of time.

The actual time interval which the double beat valve 95 is maintained in its lower seated position following separation of the contact fingers 152 and 153 of the inertia device 17 will vary with the fluid pressure in the control pipe 15 acting on the inner seated area of the double beat valve in the passage 98. Similarly this delay time will vary with the resistance of the resistor 24. For purposes of illustration, the magnet valve device 19 and its magnet winding 97 may be so designed that with a resistor 24 of twenty-five ohms connected in shunt relation to the winding 97 and a pressure of fifty pounds per square inch in the control pipe 15, the delay time may be of the order of one-half of a second.

It should be understood that the resistor 24 functions only to delay the deenergization of the electromagnet winding 97 of the magnet valve device 19 and that it is ineffective to delay the energization of the magnet winding 97. This asymmetric delay characteristic of resistor 24 is of distinct advantage in the operation of the brake equipment as will be explained more fully hereinafter.

Operation of equipment

Let it be assumed that the main reservoir 12 and the supply pipe 13 are charged to the normal pressure carried therein, as from a fluid compressor, not shown, and that the car or vehicle is traveling at a uniform speed under power or coasting with the brake valve handle 20 in its normal brake release position. It will be apparent that with the brake valve handle 20 in its release position and the control pipe 15 accordingly at atmospheric pressure, the pressure switch 23 is in its circuit-opening position. It will also be apparent that since the car or vehicle is traveling at a substantially uniform speed, the contact fingers 151, 152 and 153 of the inertia device 17 are disengaged from each other so that the magnet valve devices 19 and 21 of the control valve device 14 are deenergized to connect chambers 88 and 93 to the control pipe 15. Under the circumstances, it will be apparent that the relay valve section 26 of the control valve device 14 is conditioned to exhaust fluid under pressure from the brake cylinder 11 and effect release of the brakes.

To effect an application of the brakes, the operator of the vehicle shifts the brake valve handle 20 out of its normal release position to a position corresponding to the desired degree of application of the brakes. Thereupon, the control pipe 15 is charged to a corresponding pressure, as are the chambers 88 and 93 of the control valve device 14. At the same time, when the pressure in the control pipe 15 exceeds the uniform low value previously assumed, the contact-bridging member 163 of the pressure switch 23 is shifted into contact with contact members 164.

Accordingly, with both of the chambers 88 and 93 charged to the pressure in the control pipe 15, the relay valve section 26 is operated, as previously described, to establish a pressure in the brake cylinder 11 which is substantially equal to the pressure established in the control pipe 15, thereby applying the brakes on the vehicle wheels to a corresponding degree.

Let it now be assumed that due to the application of the brakes, a vehicle wheel begins to slip. In such case, the inertia device 17 responds and effects engagement of the contact fingers 151, 152 and 153 thereof to cause simultaneous energization of the two magnet valve devices 19 and 21 of the control valve device 14. As previously stated, the resistor 24 in shunt relation to the magnet winding 97 of the magnet valve 19 is ineffective to delay the energization of the magnet winding 97 and thus both the magnet valve devices 19 and 21 are rapidly operated so as to vent fluid under pressure from the diaphragm chambers 88 and 93 respectively. Being very sensitive to variations in the operating force therefor, the relay valve section 26 of the control valve device 14 thus operates very rapidly to exhaust fluid under pressure from the brake cylinder 11 to effect complete release of the brakes on the slipping wheel.

The control valve device 14 operates so rapidly in response to the initiation of wheel-slipping as to completely release the brakes on the slipping wheel in less time than it takes the slipping wheel to decelerate from a speed corresponding to vehicle speed down to zero speed or the locked-wheel state, the vehicle wheel ceases its deceleration and begins to accelerate back toward a speed corresponding to vehicle speed.

As a result of the change from deceleration to acceleration of the slipping wheel, the fly-wheel 121 of the inertia device 17 changes from a leading to a lagging position with respect to the disk 134 on the driving shaft 122. Obviously, in changing from a leading to a lagging position, the fly-wheel 121 shifts momentarily in the left-hand axial direction to its normal position and then back in the right-hand direction. The fly-wheel 121 is only momentarily in its normal position but the contact fingers 151, 152 and 153 are nevertheless momentarily disengaged and, as a result, both the magnet valve devices 19 and 21 of the control valve device 14 would be momentarily deenergized to effect the resupply of fluid under pressure from the control pipe 15 to the diaphragm chambers 93 and 88 and thus a momentary and partial reapplication of the brakes, unless such operation is prevented. According to my invention, the resistor 24 functions to prevent such operation by maintaining the magnet winding 97 of magnet valve 19 sufficiently energized to prevent the supply of fluid under pressure from the control pipe 15 to the chamber 93 during the momentary changeover of the fly-wheel 121 from a leading to a lagging position with respect to the disk 134.

In the case of the magnet valve device 21, the previously described holding circuit established by the pressure switch 23 and the contact-bridging member 109 of the magnet valve device 21 causes the magnet valve device 21 to remain energized, notwithstanding the momentary separation of contact fingers 151 and 152 of the inertia device 17, and thus maintain diaphragm chamber 88 vented to atmosphere.

It will thus be apparent that the resistor 24 prevents even momentary partial reapplication of the brakes at the time that the vehicle wheel changes from deceleration to acceleration while slipping.

As previously stated, in order to insure that a vehicle wheel will cease deceleration and start to accelerate, once it has started to slip due to the application of the brakes, the brake application should be substantially completely released. It follows, therefore, that a momentary reapplication of the brakes, even to a partial degree, while the vehicle wheel is slipping may cause the vehicle wheel to continue deceleration until the locked-wheel state is reached which of course will result in sliding of the vehicle wheel. The ultimate function of the resistor 24 is, therefore, to prevent the possibility of the vehicle wheel attaining the locked-wheel state and sliding due to the momentary partial reapplication of the brakes which might otherwise occur when the vehicle wheel changes from deceleration to acceleration while slipping.

When the slipping vehicle wheel approaches a speed corresponding to vehicle speed and reduces in rate of acceleration sufficiently, the fly-wheel 121 of the inertia device 17 is snapped back to its normal position shown in the drawing, wherein the contact fingers 151, 152 and 153 are disengaged from each other. As previously explained, the holding circuit including the pressure switch 23 and contact-bridging member 109 of the magnet valve device 21 maintains the electromagnet winding 107 of the magnet valve device 21 energized notwithstanding the separation of the contact fingers 151 and 152. Thus, as long as the pressure in the control pipe 15 exceeds the certain uniform low pressure necessary to keep pressure switch 23 closed, fluid under pressure cannot thereafter, during the application of the brakes, be resupplied to the diaphragm chamber 88.

Just as in the case of the momentary separation of the contact fingers 152 and 153 of the inertia device 17, the resistor 24 now functions also to delay the deenergization of the magnet winding 97 of the magnet valve 19 for a definite interval of time following the separation of the contact fingers 152 and 153 which will insure the vehicle wheels actually attaining a speed corresponding to vehicle speed. Upon the elapse of the delay interval and the consequent deenergization of the electromagnet winding 97 of the magnet valve device 19, the double beat valve 95 returns to its upper seated position and thus reestablishes communication through which fluid under pressure is supplied from the control pipe 15 to the chamber 93 at the right of the smaller diaphragm 79.

The utility of the pressure maintaining feature of the brake valve device 16 should now be apparent for, with the volume of the diaphragm chamber 93 suddenly connected to the control pipe 15, a drop of the pressure in the control pipe would result unless additional fluid under pressure were supplied through the brake valve 16 to maintain the pressure in the control pipe 15 and diaphragm chamber 93 at a pressure corresponding to the displacement of the brake valve handle 20 out of its normal release position. The pressure in the control pipe 15 is thus maintained and accordingly the pressure switch 23 maintains the magnet valve device 21 energized by way of its holding circuit so as to maintain the diaphragm chamber 88 vented to atmosphere.

It should now be apparent that since only the diaphragm chamber 93 is recharged with fluid under pressure, the relay valve section 26 of the control valve device 14 operates to establish a pressure in the brake cylinder 11 which corresponds —not to the original pressure which initiated the wheel slipping—but rather to a fraction of such pressure. If, as previously assumed, the area of the smaller diaphragm 79 is seventy-five per cent of the area of the larger diaphragm 78, then the pressure established in the brake cylinder 11 upon reapplication of the brakes following slipping of the wheel, will be three-fourths of the pressure established in the control pipe 15. Thus, by only partially restoring the application of the brakes on the wheels which slip, the possibility of recurrence of wheel-slipping during the remainder of the application of the brakes is rendered unlikely.

It will be seen, therefore, that the resistor 24 associated with the magnet valve 19 of control valve device 14 also functions to so delay the reapplication of the brakes on a slipping vehicle wheel as to prevent reapplication of the brakes on the slipping wheel, to even a partial degree, before the vehicle wheel actually rotates at the speed of the vehicle. As previously mentioned, the partial reapplication of the brakes on a slipping wheel before the vehicle wheel definitely attains vehicle speed might result in recurrence of wheel-slipping which would be undesirable.

It will be apparent that the operator of the vehicle retains control of the degree of application even after the inertia device 17 operates to reduce the brake cylinder pressure. Obviously, with the magnet valve device 19 deenergized, the operator may operate the brake valve device 16 to vary the pressure in the control pipe 15 and thus vary the pressure in the diaphragm chamber 93. In such case, the relay valve section 26 of control valve device 14 operates in response to the variation of fluid pressure in chamber 93 to effect a corresponding variation of the pressure in the brake cylinder 11.

After the vehicle is brought to a complete stop and it is desired to release the brakes before starting again, the operator merely returns the brake valve handle 20 to its normal release position to reduce the pressure in the control pipe 15 to atmospheric pressure. The relay valve section 26 of control valve device 14 then operates in response to the reduced pressure in the diaphragm chamber 93 to effect the complete exhaust of fluid under pressure from the brake cylinder 11 and the corresponding complete release of the brakes. When the pressure in the control pipe 15 reduces sufficiently, pressure switch 23 is operated to interrupt the holding circuit of the magnet valve 21 and, as a result, the magnet valve 21 is deenergized.

*Summary*

Summarizing, it will be seen that I have disclosed an improved brake control equipment for guarding against sliding of vehicle wheels due to application of the brakes. The type of brake control equipment to which my invention is applicable includes an inertia device of the flywheel type which is responsive to the slipping of the vehicle wheel for controlling an electropneumatic relay valve device to automatically release the brakes at a rapid rate on initiation of wheel-slipping, to cause the slipping wheel to accelerate back toward a speed corresponding to vehicle speed without actually attaining the locked-wheel state. The electropneumatic device comprises a pair of magnetic valve devices which are effective to control the degree of pressure established in the brake cylinder. When wheel-slipping occurs, the inertia device is effective to cause energization of the two magnet valve devices and the consequent complete release of the brakes. When the vehicle wheel returns to a speed corresponding to vehicle speed following slipping thereof, the inertia device is effective to cause deenergization of only one magnet valve device, which results in the restoration of a pressure in the brake cylinder which is only a fraction of that which initiated the wheel-slipping.

The characteristics of the fly-wheel inertia device are such, however, that momentary and premature deenergization of the last mentioned magnet valve occurs when the vehicle wheel changes from deceleration to acceleration while slipping and as the wheel approaches vehicle speed, thus rendering possible the recurrence of wheel-slipping and even wheel-sliding.

According to my invention, a resistor is provided in shunt relation to the reapplication magnet valve which delays deenergization of the magnet valve notwithstanding the operation of the inertia device to deenergize the magnet valve. Thus, once the brakes are released upon initiation of the wheel slipping, they are maintained released until the slipping vehicle wheel definitely returns to a speed corresponding to vehicle speed, at which time the reapplication may be safely effected with minimum possibility of recurrence of wheel-slipping.

While I have disclosed a brake control equipment for controlling the pressure in only one brake cylinder, it will be apparent that in the adaptation of the brake control equipment to a train of cars having a plurality of brake cylinders, duplicate equipment is provided for each brake cylinder. Furthermore in the adaptation in the brake control equipment to a train of cars, the supply pipe 13 and control pipe 15 may continue throughout all of the cars of the train to provide the necessary control pressure in order to enable the control of the pressure in the plurality of brake cylinders under the control of a single brake valve device on one car of the train.

Thus it will be apparent that while I have illustrated my invention in connection with only one type of brake control equipment, various omissions, additions and modifications may be made in the equipment shown without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle brake equipment comprising control means, relay means controlled by the control means for effecting application and release of the brakes on a vehicle wheel, means effective upon slipping of the vehicle wheel during an application of the brakes for causing operation of the relay means to effect first the release and then the reapplication of the brakes on the wheel, and means for delaying operation of the relay means to effect reapplication of the brakes on the wheel for a limited time after the wheel-slip responsive means is conditioned to effect reapplication of the brakes.

2. A vehicle brake equipment comprising control means, relay means controlled by the control means for effecting application and release of the brakes on a vehicle wheel, means effective upon slipping of the vehicle wheel during an application of the brakes for causing operation of the relay means to effect first the release and then the reapplication of the brakes on the wheel, and timing means for preventing operation of the relay means to effect reapplication of the brakes on the wheel for a limited time after the wheel-slip responsive means is conditioned to effect reapplication of the brakes.

3. A vehicle brake equipment comprising control means, relay means controlled by the control means for effecting application and release of the brakes on a vehicle wheel, means effective upon slipping of the vehicle wheel during an application of the brakes for causing operation of the relay means to effect first the release and then the reapplication of the brakes on the wheel, and electrical timing means for preventing operation of the relay means to effect reapplication of the brakes on the wheel for a limited time after the wheel-slip responsive means is conditioned to effect reapplication of the brakes.

4. A vehicle brake equipment comprising fluid pressure operated means for controlling the application and release of the brakes on a vehicle wheel, brake control means for causing fluid under pressure to be supplied to and released from the fluid pressure operated means to effect application and release, respectively, of the brakes, means effective upon deceleration of the vehicle wheel, in slipping, to cause release of fluid under pressure from the said fluid pressure operated means to effect release of the brakes independently of the brake control means, and conditioned upon acceleration of the vehicle wheel toward vehicle speed, while slipping, to effect the resupply of fluid under pressure to the said fluid pressure operated means to effect reapplication of the brakes, and means for inhibiting the resupply of fluid under pressure to the said fluid pressure operated means to delay the reapplication of the brakes.

5. A vehicle brake equipment comprising fluid pressure operated means for controlling the application and release of the brakes on a vehicle wheel, brake control means for causing fluid under pressure to be supplied to and released from the fluid pressure operated means to effect application and release, respectively, of the brakes, means effective upon deceleration of the vehicle wheel, in slipping, to cause release of fluid under pressure from the said fluid pressure operated means to effect release of the brakes independently of the brake control means, and conditioned upon acceleration of the vehicle wheel toward vehicle speed, while slipping, to effect the resupply of fluid under pressure to the said fluid pressure operated means to effect reapplication of the brakes, and means for preventing the flow of fluid under pressure to the fluid pressure operated means for a limited time after the last said means is conditioned to cause resupply of fluid under pressure to the fluid pressure operated means to prevent the operation of the said fluid pressure operated means to effect reapplication of the brakes for the limited time.

6. A vehicle brake equipment comprising valve means operatively controlling the supply of fluid under pressure and the release of fluid under pressure to effect application and release of the brakes on a vehicle wheel, means providing two chambers, said valve means being operative to effect a certain degree of application of the brakes whenever one of said chambers is charged with fluid at a given pressure and operative when only the other of said chambers is charged with fluid at the given pressure for effecting application of the brakes to a degree less than said certain degree, brake control means operative to cause fluid under pressure to be supplied to both of said chambers and released from both of said chambers, means effective upon deceleration of the vehicle wheel, in slipping, to release fluid under pressure from both of said chambers to effect release of the brakes independently of the brake control means and conditioned upon acceleration of the vehicle wheel toward vehicle speed, while slipping, to cause resupply of fluid under pressure to only the other of said chambers, and means for inhibiting the supply of fluid under pressure to the said other chamber to delay the operation of the said valve means to effect reapplication of the brakes.

7. A vehicle brake equipment comprising valve means operatively controlling the supply of fluid under pressure and the release of fluid under pressure to effect application and release of the brakes on a vehicle wheel, means providing two chambers, said valve means being operative to effect a certain degree of application of the brakes whenever one of said chambers is charged with fluid at a given pressure and operative when only the other of said chambers is charged with fluid at the given pressure for effecting application of the brakes to a degree less than said certain degree, brake control means operative to cause fluid under pressure to be supplied to both of said chambers and released from both of said chambers, means effective upon deceleration of the vehicle wheel, in slipping, to release fluid under pressure from both of said chambers to effect release of the brakes independently of the brake control means and conditioned upon acceleration of the vehicle wheel toward vehicle speed, while slipping, to cause resupply of fluid under pressure to only the other of said chambers, and means effective for a limited time, following the operation of the last said means to cause the resupply of fluid under pressure to the said other chamber, for preventing the supply of fluid under pressure to the said other chamber whereby to delay the operation of the valve means to effect reapplication of the brakes.

8. In a vehicle brake equipment, the combination of fluid pressure operated means controlling application and release of the brakes on a vehicle wheel, and brake control means for causing fluid under pressure to be supplied to and released from the said fluid pressure operated means to effect application and release, respectively, of the brakes, means effective when the vehicle wheel decelerates, in slipping, to cause release of fluid under pressure from the fluid pressure operated means and when the vehicle wheel accelerates toward vehicle speed, while slipping, to be conditioned to cause resupply of fluid under pressure to the fluid pressure operated means, and means effective as long as the vehicle wheel does not slip for permitting the immediate supply of fluid under pressure to the fluid pressure operated means and effective once the vehicle wheel slips for inhibiting the resupply of fluid under pressure to the fluid pressure operated means.

9. A vehicle brake equipment comprising means for effecting application and release of the brakes on the vehicle, a normally open circuit, electroresponsive means operating on said circuit and effective upon the closing of said circuit during an application of the brakes to effect the release of the brakes on a vehicle wheel and upon the reopening of said circuit during an application of the brakes to effect reapplication of the brakes on the said wheel, means for closing said circuit when the wheel begins to slip and for opening said circuit when the wheel returns toward a speed corresponding to vehicle speed, and means for preventing operation of said electroresponsive means to effect reapplication of the brakes on the wheel for a limited time following the opening of said circuit.

10. A vehicle brake equipment comprising means for effecting application and release of the brakes on the vehicle, a normally open circuit, electroresponsive means operating on said circuit and effective upon the closing of said circuit during an application of the brakes to effect the release of the brakes on a vehicle wheel and upon the reopening of said circuit during an application of the brakes to effect reapplication of the brakes on the said wheel, means for closing said circuit when the wheel begins to slip and for opening said circuit when the wheel returns toward a speed corresponding to vehicle speed, and means connected in said circuit and effective to prevent operation of said electroresponsive means to effect reapplication of the brakes on the vehicle wheel for a limited time after said circuit is interrupted.

11. A vehicle brake equipment comprising means for effecting application and release of the brakes on the vehicle, a normally open circuit, electroresponsive means operating on said circuit and adapted to be energized on the closing of said circuit to effect release of the brakes on a vehicle wheel during an application of the brakes and deenergized upon the interruption of said circuit to effect reapplication of the brakes on the wheel, means connected in said circuit in shunt relation to the said electroresponsive means and adapted to form a local discharge circuit for current induced in the electroresponsive means due to the interruption of the first said circuit so as to cause the electroresponsive means to be energized for a limited time after the interruption of said circuit, and means operative to close the first said circuit when the wheel begins to slip and to open said circuit as the slipping wheel returns toward a speed corresponding to vehicle speed due to the release of the brakes thereon.

12. A vehicle brake system comprising electroresponsive valve means effective when deenergized to establish a communication through which fluid under pressure is supplied to effect application of the brakes on a vehicle wheel and when energized to close said communication and establish another communication through which fluid under pressure is released to effect release of the brakes, means operative when the vehicle wheel begins to slip due to the application of the brakes to cause current to be supplied for energizing said electroresponsive means and operative upon the return of the vehicle wheel toward a speed corresponding to vehicle speed as a result of the release of the brakes for interrupting the supply of current to the electroresponsive means, and means for maintaining said electroresponsive valve means in its energized position for an interval of time after the interruption of the supply of current.

13. A vehicle brake system comprising electroresponsive valve means effective when deenergized to establish a communication through which fluid under pressure is supplied to effect application of the brakes on a vehicle wheel and when energized to close said communication and establish another communication through which fluid under pressure is released to effect release of the brakes, means operative upon the slipping of the vehicle wheel due to the application of the brakes for completing a circuit for energizing said electroresponsive means and operative upon the return of the vehicle wheel toward a speed corresponding to vehicle speed as a result of the release of the brakes for interrupting the circuit, and means for causing said electroresponsive valve means to be energized for a limited time after interruption of said circuit to prevent reapplication of the brakes until after the vehicle wheel returns to a speed corresponding to vehicle speed.

14. A vehicle brake system comprising electroresponsive valve means effective when deenergized to establish a communication through which fluid under pressure is supplied to effect application of the brakes on a vehicle wheel and when energized to close said communication and establish another communication through which fluid under pressure is released to effect release of the brakes, means operative upon slipping of the vehicle wheel due to the application of the brakes for completing a circuit for energizing said electroresponsive means and operative upon the return of the vehicle wheel toward a speed corresponding to vehicle speed as a result of the release of the brakes for interrupting the circuit, and means for inhibiting the return of the electroresponsive means to its deenergized position for a limited time after the interruption of the circuit.

15. A vehicle brake system comprising electroresponsive valve means effective when deenergized to establish a communication through which fluid under pressure is supplied to effect application of the brakes on a vehicle wheel and when energized to close said communication and establish another communication through which fluid under pressure is released to effect release of the brakes, means operative upon the slipping of the vehicle wheel due to the application of the brakes for completing a circuit for energizing said electroresponsive means and operative upon the return of the vehicle wheel toward a speed corresponding to vehicle speed as a result of the release of the brakes for interrupting the circuit, and a discharge circuit including the said electroresponsive means through which current produced by dissipation of the stored energy in the electroresponsive valve means flows for maintaining the said electroresponsive valve means energized for a limited time after the interruption of the first said circuit.

16. A vehicle brake system comprising electroresponsive valve means having an electromagnet winding and effective when the winding is deenergized to establish a communication through which fluid under pressure is supplied to effect application of the brakes on a vehicle wheel and when the winding is energized to close said communication and establish another communication through which fluid under pressure is released to effect release of the brakes, means operative upon the slipping of the vehicle wheel due to the application of the brakes for completing a circuit for energizing the winding of said electroresponsive means and operative upon the return of the vehicle wheel toward a speed corresponding to vehicle speed as a result of the release of the brakes for interrupting the circuit, and a resistor in shunt relation to the winding of the electroresponsive valve means and forming a discharge circuit including the winding of the electroresponsive valve means for current induced in the winding upon interruption of the first said circuit for causing the winding of the said electroresponsive valve means to be energized for a limited time after the interruption of the first said circuit.

17. A vehicle brake system comprising two electroresponsive valve devices effective when both are deenergized to establish communication through which fluid under pressure is supplied to effect one degree of application of the brakes on a vehicle wheel, effective when both are energized to close said communication and establish other communication through which fluid under pressure is released to effect release of the brakes, and effective when a certain one of said electroresponsive valve devices is energized and the other is deenergized for establishing communication through which fluid under pressure is supplied to effect application of the brakes to a degree different from said one degree, means operative when the vehicle wheel begins to slip for effecting energization of both said electroresponsive valve devices and subsequently as the vehicle wheel returns toward a speed corresponding to vehicle speed for causing deenergization of the electroresponsive valve devices, means effective once said one electroresponsive valve device is energized for maintaining it energized during the remainder of the application of the brakes notwithstanding operation of said last means to effect deenergization thereof, and means for delaying the return of the said other electroresponsive means to its deenergized position for a limited time after the wheel-slip responsive means operates to cause deenergization of the electroresponsive valve devices.

18. A vehicle brake system comprising two electroresponsive valve devices effective when both are deenergized to establish communication through which fluid under pressure is supplied to effect one degree of application of the brakes on a vehicle wheel, effective when both are energized to close said communication and establish other communication through which fluid under pressure is released to effect release of the brakes, and effective when a certain one of said electroresponsive valve devices is energized and the other is deenergized for establishing communication through which fluid under pressure is supplied to effect application of the brakes to a degree different from said one degree, means operative when the vehicle wheel begins to slip for effecting energization of both said electroresponsive valve devices and subsequently as the vehicle wheel returns toward a speed corresponding to vehicle speed for causing deenergization of the electroresponsive valve devices, means effective once said one electroresponsive valve device is energized for maintaining it energized during the remainder of the application of the brakes notwithstanding operation of said last means to effect deenergization thereof, and a resistor connected in shunt relation to the said other electroresponsive valve device for causing the said other electroresponsive valve device to be inductively energized for a limited time after the wheel-slip responsive means operates to cause deenergization thereof.

19. A vehicle brake equipment comprising means for effecting application of the brakes on a vehicle wheel, circuit-controlling means normally in a circuit-opening position, means controlled by said circuit-controlling means and operative when the circuit-controlling means is shifted to circuit-closing position while said first means is conditioned to effect application of the brakes for effecting release of the brakes and operative when the circuit-controlling means is shifted to circuit-opening position for effecting reapplication of the brakes, and means effective when the circuit-controlling means is shifted rapidly from circuit-closing position to circuit-opening position and back to circuit-closing position for preventing reapplication of the brakes.

20. A vehicle brake system comprising means for effecting application of the brakes on a vehicle wheel, circuit-controlling means normally in a circuit-opening position, electroresponsive means controlled by said circuit-controlling means and operative when the circuit-controlling means is shifted to circuit-closing position for effecting release of the brakes and upon operation of the circuit-controlling means to circuit-opening position to effect reapplication of the brakes, means effective during one rotative condition of the vehicle wheel for effecting operation of the circuit-controlling means to circuit-closing position and operative during a different rotative condition of said wheel for effecting operation of the circuit-controlling means to circuit-opening position, and means effective in the event of operation of the circuit-controlling means momentarily out of circuit-closing position to circuit-opening position for preventing reapplication of the brakes.

21. A vehicle brake system comprising means for effecting application of the brakes on a vehicle wheel, an inertia element shiftable to a leading or lagging position with respect to a normal position upon retardation or acceleration, respectively, of a vehicle wheel at a rate in excess of a certain rate, means controlled by the inertia element and effective during an application of the brakes when the inertia element is shifted to a leading or lagging position to effect release of the brakes and effective when the inertia element shifts to its normal position to effect reapplication of the brakes, and means effective to prevent operation of said last means to cause reapplication of the brakes when the inertia element shifts from a leading position through its normal position to its lagging position as a result of the release of the brakes on the vehicle wheel and its subsequent acceleration back toward a speed corresponding to vehicle speed.

22. A vehicle brake system comprising an electroresponsive valve device effective when deenergized to establish communication through which fluid under pressure is supplied to effect application of the brakes on a vehicle wheel and effective when energized to close said communication and establish other communication through which fluid under pressure is released to effect release of the brakes, a circuit on which the electroresponsive valve device operates, switch means for opening and closing said circuit to effect energization and deenergization of the electroresponsive valve device, an inertia element shiftable to a leading or a lagging position with respect to a normal position when a vehicle wheel is retarded or accelerated, respectively, at a rate exceeding a certan uniform rate and arranged to effect operation of the switch means to close said circuit only when in a leading or lagging position with respect to the normal position thereof, and a resistor in shunt relation to the said electroresponsive valve device in said circuit for causing energization of the electroresponsive valve device inductively so as to prevent momentary reapplication of the brakes when the switch means is shifted momentarily to open the said circuit at the time the inertia element shifts from a leading position through its normal position to a lagging position.

23. A vehicle brake system comprising means for causing fluid under pressure to be supplied through a communication to effect application of the brakes on a vehicle wheel, an electroresponsive valve device effective when energized to close said communication and establish a different communication through which fluid under pressure is released to effect release of the brakes, a normally open circuit on which said electroresponsive valve device operates, a rotary inertia element, a rotary member rotatable according to the speed of rotation of the vehicle wheel, said rotary inertia element having a normal position with respect to said rotary member and adapted to be rotated thereby, said rotary inertia element being shiftable to a leading position with respect to its normal position upon slipping of the vehicle wheel due to application of the brakes and effective in its leading position to cause completion of said circuit and consequent release of the brakes, said rotary inertia element being shiftable from a leading position through its normal position to a lagging position and effective thereby to interrupt said circuit momentarily when the vehicle wheel changes from retardation to acceleration while slipping and subsequently shiftable to its normal position as the vehicle wheel approaches a speed corresponding to vehicle speed, and means connected in said circuit in shunt relation to the electroresponsive valve device for causing energization of the electroresponsive valve device inductively for a limited time after interruption of said circuit to thereby prevent reapplication of the brakes when the circuit is momentarily interrupted at the time the vehicle wheel changes from retardation to acceleration and to delay the reapplication of the brakes for a limited time after the vehicle wheel reaches a speed corresponding to vehicle speed.

24. A vehicle brake system comprising a brake cylinder, a valve mechanism having two chambers and operative whenever fluid at a given pressure is supplied to both said chambers to cause fluid under pressure to be supplied to said brake cylinder to establish a certain pressure therein and operative when fluid at the given pressure is supplied to only a certain one of said chambers to cause fluid under pressure to be supplied to the brake cylinder to establish therein a pressure which is lower than said certain pressure, two electroresponsive valve devices effective when deenergized to establish communication through which fluid under pressure is supplied to both said chambers, effective when both are energized to close communication through which fluid under pressure is supplied to both said chambers and to effect the release of fluid under pressure from both said chambers, and effective when one of said electroresponsive valve devices is energized and the other is deenergized for establishing communication through which fluid under pressure is supplied to only said certain one chamber, means operative when a vehicle wheel slips for effecting energization of both said electroresponsive valve devices and operative, as the vehicle wheel approaches a speed corresponding to vehicle speed, due to the release of the brakes, to a position for causing deenergization of both said electroresponsive valve devices, means effective once said one electroresponsive valve device is energized to maintain it energized thereafter during the application of the brakes independently of the return of the wheel-slip means to the said position for effecting its deenergization, and means for causing the other of said electroresponsive valve devices to be energized for a limited time after the wheel-slip means returns to a position for causing deenergization thereof.

RICHARD L. NASH.